Nov. 2, 1926.

J. H. CLARK 1,605,217

FRAME SUPPORT FOR VEHICLES

Filed Feb. 6, 1923   2 Sheets-Sheet 1

Inventor
James H. Clark

Attorneys

Nov. 2, 1926.                                                           1,605,217
J. H. CLARK
FRAME SUPPORT FOR VEHICLES
Filed Feb. 6, 1923                            2 Sheets-Sheet 2
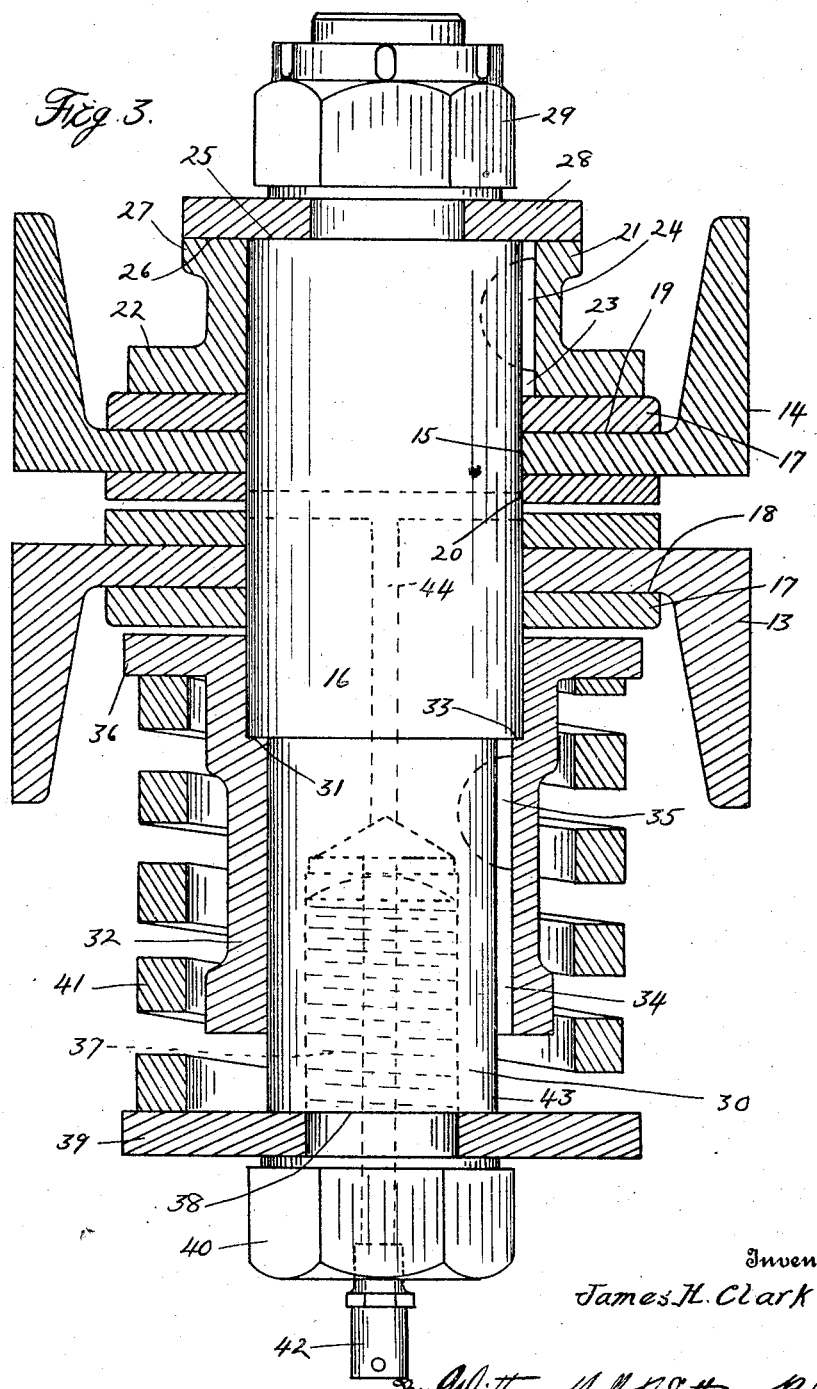
Inventor
James H. Clark
By Whittemore Hulbert Whittemore & Belknap
Attorneys Patented Nov. 2, 1926.

1,605,217

UNITED STATES PATENT OFFICE.

JAMES H. CLARK, OF RIVER ROUGE, MICHIGAN.

FRAME SUPPORT FOR VEHICLES.

Application filed February 6, 1923. Serial No. 617,402.

This invention relates to vehicles and refers more particularly to the means employed for supporting the main frame of the vehicle upon the wheeled trucks thereof.

An object of the invention is to provide the supports for the frame with simple and effective cushion means which will absorb any shocks and jars which are not absorbed by the usual leaf springs of the wheeled trucks.

Another object is to provide a strong and durable construction which can be manufactured at a very low cost.

With the above and other objects in view the invention consists in certain novel features of construction, combination and arrangement of parts as will be more fully described and particularly pointed out in the appended claims.

In the accompanying drawing:

Figure 3 is a vertical sectional view taken on line 3—3 of Figure 1.

Figure 1:
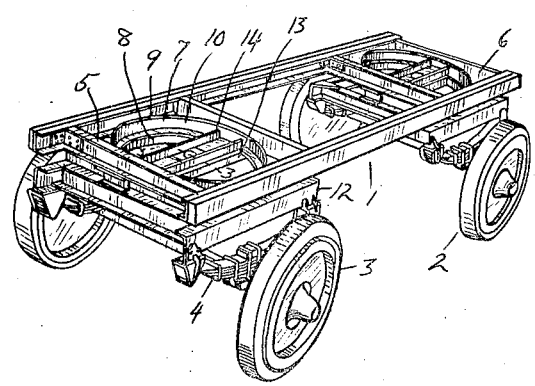
Figure 1 is a perspective view of a trailer embodying my invention.
Figure 2:
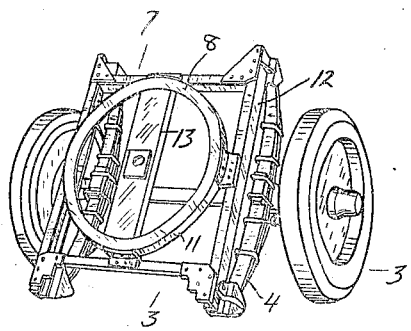
Figure 2 is a perspective view of one of the wheeled trucks and showing the frame thereof inclined forwardly.

Referring now to the drawing in which like characters of reference designate corresponding parts throughout the several views, the numeral 1 designates the horizontal main frame supported at its ends upon a pair of wheeled trucks 2 and 3 respectively which are preferably identical in construction and which are provided with the usual leaf springs 4.

The supports at each end of the frame are designated generally by the numerals 5 and 6 respectively and are preferably identical in construction, consequently only one will be described. In detail, the support 5 at the forward end of the frame 1 preferably comprises a fifth wheel 7 which is provided with upper and lower horizontal ring sections 8 and 9 respectively. The upper section 9 of the fifth wheel is preferably provided with an upstanding annular flange 10 which is secured to the frame 1, while the lower section 8 is preferably provided with a depending annular flange 11 which is secured to the frame 12 of the wheeled truck 2. Oppositely disposed channel-shaped cross members 13 and 14 respectively are secured to the upper and lower sections of the fifth wheel and are provided with aligned openings 15 which receive a vertical kingbolt 16. Reinforcing plates 17 are preferably secured to the opposite sides of the bases 18 and 19 respectively of the cross members and are also provided with openings 20 which receive the kingbolt 16. A relatively short sleeve 21 preferably surrounds the kingbolt above the cross bar 14 and is provided with an annular flange 22 which extends outwardly therefrom at its lower end and which normally engages the uppermost plate 17. The sleeve 21 is also preferably provided with a vertical groove 23 which receives a key 24 upon the kingbolt. The kingbolt is preferably reduced at its upper end above the sleeve 21 to provide an annular shoulder 25 which is normally in alignment with the upper surface 26 of an annular flange 27 formed upon the sleeve 21 at the upper end thereof. A metallic washer 28 surrounds the reduced portion of the kingbolt and is retained in engagement with the annular shoulder 25 by means of a suitable nut 29 which is threaded onto the reduced portion of the kingbolt.

The kingbolt is also reduced at its lower end, as shown at 30, to provide an annular shoulder 31. A sleeve 32 surrounds the king bolt below the lowermost plate 17 and is provided with an annular shoulder 33 which normally engages the annular shoulder 31 of the kingbolt. Thus the kingbolt will move the sleeve 32 downwardly therewith while the latter will return the kingbolt to normal position. The sleeve 32 is preferably provided with a vertical groove 34 which receives a key 35 upon the reduced portion 30 of the kingbolt while at its upper end the sleeve 32 is provided with an outwardly extending annular flange 36 which normally engages the lowermost plate 17.

The reduced portion 30 of the king-bolt is preferably provided with a threaded socket 37 which receives a suitable bolt 38. A metallic washer 39 surrounds the bolt 38 between the head 40 thereof and the lower end of the kingbolt and is adapted to limit the downward movement of the sleeve 32.

A coil spring 41 of predetermined weight preferably surrounds the sleeve 32 and the reduced portion 30 of the kingbolt between the metallic washer 39 and the annular flange 36 and normally retains the sections 8 and 9 of the fifth wheel together.

An alemite fitting 42 is preferably mounted upon the head 40 of the bolt 38 and is adapted to supply a suitable lubricant through a longitudinal passage 43 in the bolt 38 to a T-shaped passage 44 in the kingbolt for lubricating the movable parts of the support.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

1. In a vehicle, the combination with a frame and a wheeled truck, of a support for said frame upon said wheel truck comprising a fifth wheel having sections secured to said frame and to said wheeled truck, a pair of cross members secured to the sections of said fifth wheel, a kingbolt longitudinally connecting said cross members, flanged sleeves mounted on said kingbolt upon opposite sides of said cross members, means at the ends of said kingbolt for detachably retaining said sleeve thereon, and yieldable means between the flange of one of said sleeves and the retaining means at one end of said kingbolt for cushioning the sections of said fifth wheel.

2. In a vehicle, the combination with a frame and a wheeled truck, of a support for said frame upon said wheeled truck comprising a fifth wheel having sections secured to said frame and to said wheeled truck, cross members secured to the sections of said fifth wheels, a member pivotally connecting said cross members, members slidably mounted upon the second mentioned member upon opposite sides of said cross members, means at the ends of the second mentioned members for detachably retaining said slidable members thereon, one of said slidable members having a flange, and yieldable means between the flange of said slidable member and the retaining means at one end of the second mentioned member for cushioning the sections of said fifth wheel.

3. In a vehicle, the combination with a frame and a wheeled truck, of a support for said frame upon said truck comprising a fifth wheel having sections secured to said frame and to said truck, cross members secured to said sections, a member pivotally connecting said cross members, a pair of sleeves slidably mounted on the last-mentioned member upon opposite sides of said cross members and having a flange, a member carried by the last-mentioned member, and yieldable means exerting a pressure between the last-mentioned member and the flange of one of said sleeves for cushioning the sections of said fifth wheel.

4. In a vehicle, the combination with a fifth wheel having cooperating sections, of a cross bar secured to each section, means for connecting the sections of the fifth wheel, including a pivot element extending through said cross bars, washers at the opposite ends of the pivot element, sleeves surrounding the pivot element between the washers and cross bars, permitting said fifth wheel sections to be separated a limited distance, and a yieldable member cooperating with one of said sleeves and one of said washers for resisting the separation of said fifth wheel sections.

In testimony whereof I affix my signature.

JAMES H. CLARK.